(12) United States Patent
Boxmeyer et al.

(10) Patent No.: US 8,055,682 B1
(45) Date of Patent: Nov. 8, 2011

(54) SECURITY INFORMATION REPOSITORY SYSTEM AND METHOD THEREOF

(75) Inventors: James Boxmeyer, Flemington, NJ (US); David R. Gross, South River, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 289 days.

(21) Appl. No.: 11/478,890

(22) Filed: Jun. 30, 2006

(51) Int. Cl.
*G06F 17/30* (2006.01)

(52) U.S. Cl. ...................................................... 707/802

(58) Field of Classification Search .......... 707/802–804, 707/706, 740, 952
See application file for complete search history.

(56) References Cited

U.S. PATENT DOCUMENTS

| | | | |
|---|---|---|---|
| 5,974,409 A * | 10/1999 | Sanu et al. ........................ | 707/3 |
| 6,247,127 B1 * | 6/2001 | Vandergeest ................... | 713/100 |
| 6,574,624 B1 * | 6/2003 | Johnson et al. ................ | 707/750 |
| 6,654,751 B1 * | 11/2003 | Schmugar et al. ............. | 707/10 |
| 6,775,660 B2 * | 8/2004 | Lin et al. ........................ | 707/3 |
| 7,233,940 B2 * | 6/2007 | Bamberger et al. ............ | 707/3 |
| 7,310,818 B1 * | 12/2007 | Parish et al. ................... | 726/24 |
| 7,562,232 B2 * | 7/2009 | Zuili et al. ..................... | 713/194 |
| 2002/0016920 A1 * | 2/2002 | Komura et al. ................ | 713/200 |
| 2002/0087882 A1 | 7/2002 | Schneier et al. | |
| 2002/0174358 A1 * | 11/2002 | Wolff et al. ................... | 713/200 |
| 2003/0126019 A1 | 7/2003 | Taylor et al. | |
| 2005/0010821 A1 | 1/2005 | Cooper et al. | |
| 2005/0091542 A1 | 4/2005 | Banzhof | |
| 2005/0165743 A1 * | 7/2005 | Bharat et al. .................. | 707/3 |
| 2005/0229256 A2 | 10/2005 | Banzhof | |
| 2005/0273851 A1 | 12/2005 | Raju et al. | |
| 2006/0031938 A1 * | 2/2006 | Choi .............................. | 726/25 |
| 2006/0080637 A1 * | 4/2006 | Treit et al. ..................... | 717/101 |
| 2006/0174344 A1 * | 8/2006 | Costea et al. .................. | 726/24 |
| 2009/0055642 A1 * | 2/2009 | Myers et al. ................... | 713/155 |

OTHER PUBLICATIONS securitynewsportal.com "The Security News Portal for Information System Security Professionals." http://web.archive.org/web/20040626060217/www.securitynewsportal.com/index.shtml.*
threatsexposed.com. "Threats Exposed Virus Warnings." http://web.archive.org/web/20060113234432/http://www.threatsexposed.com/_viruswarn. html.*

* cited by examiner

*Primary Examiner* — Robert Timblin

(57) ABSTRACT

A method and system for maintaining a self-updating security information repository. A plurality of types of security information are stored in a corresponding plurality of information storage units, such as database tables. A plurality of configuration files respectively associated with the information storage units are stored, and each configuration file includes update parameters of the associated information storage unit. Each information storage unit is periodically automatically updated based on its update parameters. The information storage units can be searched to return security information of different types in one search.

18 Claims, 5 Drawing Sheets

| | 311 | 312 | 313 | 314 | 315 | 316 | 324 | 325 |
|---|---|---|---|---|---|---|---|---|
| | PORT | PROTOCOL | IANA APPLICATION NAME | DATE | ACTIVE | FUNCTION | SOURCE | UPDATE PERIOD |
| 317 | 21 | tcp | FTP | 06/28/2006 | Y | LISTENER | www.IANAINFO.com | 28800 |
| 318 | 22 | tcp | SSH | 06/28/2006 | Y | LISTENER | | |

| | 331 | 332 | 333 | 334 | 335 | 336 | 344 | 345 |
|---|---|---|---|---|---|---|---|---|
| | PORT | PROTOCOL | APPLICATION NAME | DATE | ACTIVE | FUNCTION | SOURCE | UPDATE PERIOD |
| 337 | 3724 | tcp | WORLD OF WARCRAFT | 06/28/2006 | Y | LISTENER | www.appinfo.com | 7200 |
| 338 | 4662 | tcp | eMule | 06/28/2006 | Y | LISTENER | | |

346 — Search Terms "port = 3724 + tcp"

| | 351 | 352 | 353 | 354 | 355 | 364 | 365 |
|---|---|---|---|---|---|---|---|
| | PORT | PROTOCOL | TROJAN NAME | DATE | FUNCTION | SOURCE | UPDATE PERIOD |
| 356 | 146 | tcp | INFECTOR | 06/28/2006 | LISTENER | www.trojaninfo.com | 7200 |
| 357 | 200 | tcp | CYBERSPY | 06/28/2006 | LISTENER | | |

| | 371 | 372 | 373 | 374 | 375 | 384 | 385 |
|---|---|---|---|---|---|---|---|
| | PORT | PROTOCOL | VIRUS/WORM NAME | DATE | FUNCTION | SOURCE | UPDATE PERIOD |
| 376 | 3127 | tcp | MyDoom.A | 06/28/2006 | LISTENER | www.virusinfo.com | 7200 |
| 377 | 400 | udp | Witty | 06/28/2006 | TRANSMITTER | | |

SECURITY INFORMATION REPOSITORY SYSTEM AND METHOD THEREOF

BACKGROUND OF THE INVENTION

The present invention is generally directed to storing network security information. More specifically, the present invention is directed to a system and method for storing different types of security information in an automated centralized security information repository.

When a network security issue arises, such as abnormal traffic in a data network, a network analyst is responsible for determining the cause of the security issue. Abnormal traffic is traffic that is not normally observed, such as sudden volume changes or unusual tcp/ip indicators. For example, abnormal traffic in a data network can be caused by viruses, worms, denial of service attacks, hackers probing a system, attempted break-ins, games, etc. In order to determine the cause of a security issue, an analyst must manually search security information sources, such as IANA port listings, IANA protocol listings, virus information listings, Trojan horse information listings, network game developers' game information, hacker web sites, search engines, newsgroups, etc. Furthermore, in order to obtain different types of security information (e.g., virus information, common port usage information, etc.), an analyst must search separate data repositories corresponding to each desired type of information. For example, an analyst interested in activity on a certain port will have to search one source for information on applications that commonly use the port, another source for virus information relating to the port, another source for games that use that port, etc. Accordingly, it is desirable to increase efficiency in security information searches.

BRIEF SUMMARY OF THE INVENTION

In order to increase efficiency of security information searches, the present invention provides a centralized security information repository to allow analysts to access multiple types of security information at once. However, because security information is continually being updated, it is difficult for an administrator to manually update the security information repository. If a security information repository is outdated, it is of little use to an analyst searching for up to date information. Accordingly, the present invention provides a self-updating security information system which acts as a central repository for different types of security information.

The system is searchable such that a user can search for multiple types of security information at once, and expandable such that new types of security information can be easily added to the system. Because the system is self-updating, users can find up to date security information without the need for an administrator to continually update the system manually.

In one embodiment of the present invention, various types of security information are stored in corresponding information storage units, such as database tables. Configuration files, each associated with one of the information storage units, are stored. The configuration file associated with an information storage unit includes update parameters of the information storage unit. Each information storage unit is periodically automatically updated according to its update parameters. The update parameters can include at least one of an update period which specifies how often the information storage unit is updated, a source list which specifies security information sources used to update the information storage unit, and a search term list which specifies search terms used to automatically search the sources specified in the search list. External searches of the sources specified in the search list are automatically performed using the search terms specified in the search term list every update period. Results of the searches are compared to security information already stored in the information storage unit, and new security information is stored in the information storage unit.

According to an embodiment of the present invention, database tables respectively corresponding to various types of security information are searched based on search terms input by a user. Results of the database search are returned to the user. Furthermore, the search terms input by the user are stored in a search database table. These search terms are used along with update parameters specified in a configuration file associated with the search database table to periodically automatically perform external searches using the input search terms. Security information resulting from the external searches is then stored in a search results database.

These and other advantages of the invention will be apparent to those of ordinary skill in the art by reference to the following detailed description and the accompanying drawings.

BRIEF DESCRIPTION OF THE DRAWINGS

FIG. 3 illustrates database tables, each storing a corresponding type of security information, and configuration files of an exemplary database according to an embodiment of the present invention;

DETAILED DESCRIPTION

Figure 1:
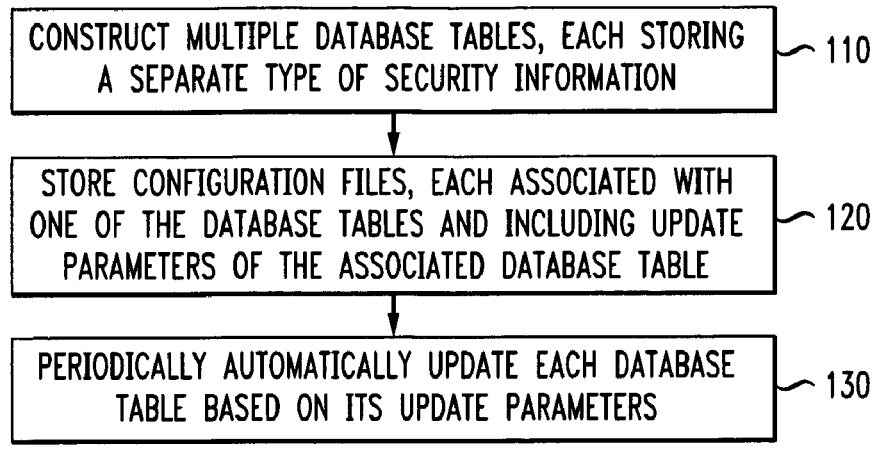
FIG. 1 illustrates a method of maintaining an automated security information repository according to an embodiment of the present invention.
Figure 2:
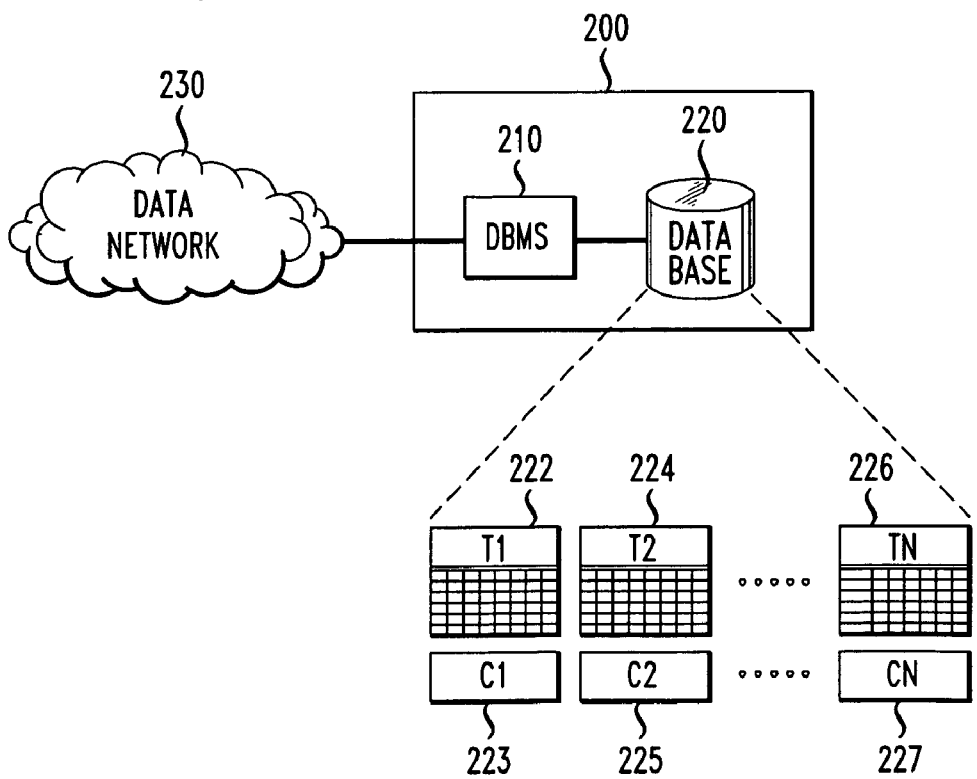
FIG. 2 illustrates an automated security information repository system according to an embodiment of the present invention.

FIG. 1 illustrates a method of maintaining an automated security information system according to an embodiment of the present invention. FIG. 2 illustrates a system 200 capable of implementing an automated security information repository according to an embodiment of the present invention. According to an embodiment of the present invention, various types of information are stored in corresponding information storage unit. As defined herein, an information storage unit is any structure capable of storing and organizing information. For example, each type of information can be stored in a corresponding database table, a corresponding database, a corresponding database record, a corresponding file, etc. Hereinafter, embodiments of the present invention are described using multiple database tables to store multiple types of security information, but the present invention is not limited to database tables, and may be implemented using any type of information storage unit. As illustrated in FIG. 2, the system 200 includes a database management system 210 and a database 220. The elements of FIG. 2 are functional elements which can be implemented using computer hardware, software, etc. The method of FIG. 1 will be described while referring to FIGS. 1 and 2.

At step 110, multiple database tables 222, 224, . . . , 226 are constructed in the database 220, each database table 222, 224, . . . , 226 for storing a separate type of security information. Security information is any information or data that can relate to network security. Examples of various types of security information include, but are not limited to, virus information, worm information, Trojan information, port and/or protocol information, information relating to applications, games, hackers, etc. The database 220 includes a plurality of database tables 222, 224, . . . , 226. Each database table 222, 224, . . . , 226 stores a corresponding type of security information. As illustrated in FIG. 2, the database 220 includes database tables T1 222, T2 224, . . . , TN 226 in which N types of security information are stored.

FIG. 3 illustrates contents of an exemplary database 300 including database tables 310, 330, 350, and 370, each storing a corresponding type of security information. As illustrated in FIG. 3, the database 300 includes an IANA (Internet Assigned Numbering Authority) port list table 310, an application table 330, a Trojan/malware table 350, and a virus/worm table 370. The IANA port list table 310 stores tcp/ip information relating to ports used by standard applications as assigned by IANA. Records 317 and 318 of the IANA port list table 310 are exemplary records, and are not intended to limit the present invention. Each record 317 and 318 of the IANA port list table 310 has a port field 311 corresponding to a port number, a protocol field 312 corresponding to a protocol (i.e., UDP, TCP, ICMP), an IANA application name field 313 corresponding to the name of the standard application that uses the port and the protocol, a date field 314 corresponding to a date on which the record was stored in the IANA port list table 310, an active field 315 indicating whether the port is actively used by the standard application, and a function field 316 corresponding to a function of the standard application (i.e., listener, transmitter, etc.).

The application table 330 stores security information relating to ports used by applications not acknowledged or assigned by IANA. Records 337 and 338 of the application table 330 are exemplary records, and are not intended to limit the present invention Each record 337 and 338 of the application table 330 has a port field 331 corresponding to a port number, a protocol field 332 corresponding to a protocol, an application name field 333 corresponding to the name of the application that uses the port and the protocol, a date field 334 corresponding to a date on which the record was stored in the application table 330, an active field 335 indicating whether the port is actively used by the application, and a function field 336 corresponding to a function of the application.

The Trojan/malware table 350 stores security information relating to known Trojans and malware. Records 356 and 357 of the Trojan/malware table 350 are exemplary records, and are not intended to limit the present invention. Each record 356 and 357 of the Trojan/malware table 350 has a Trojan name field 353 corresponding to the name of a known Trojan, a port field 351 corresponding to a port number used by the Trojan, a protocol field 352 corresponding to a protocol used by the Trojan, a date field 354 corresponding to a date on which the record was stored in the Trojan/malware table 350, and a function field 355 corresponding to a function of the Trojan.

The virus/worm table 370 stores security information relating to known viruses and worms. Records 376 and 377 of the virus/worm table 370 are exemplary records, and are not intended to limit the present invention. Each record 376 and 377 of the virus/worm table 370 has a virus/worm name field 373 corresponding to the name of a known virus or worm, a port field 371 corresponding to a port number used by the virus or worm, a protocol field 372 corresponding to a protocol used by the virus or worm, a date field 374 corresponding to a date on which the record was stored in the virus/worm table 370, and a function field 375 corresponding to a function of the virus/worm.

The database tables 310, 330, 350, and 370 of FIG. 3 are purely exemplary, and are not intended to limit the present invention. Thus, other fields may be included in any of the database tables 310, 330, 350, and 370 in addition to or in place of the fields illustrated in FIG. 3. For example, according to an embodiment of the present invention, records of a database table can have a source field corresponding to a source of the security information stored in the record. Furthermore, other tables corresponding to other types of security information may be stored in the database 200. Accordingly, the security information repository is easily expandable to add new types of information by storing new database tables corresponding to the new types of security information in the database.

Returning to FIGS. 1 and 2, at step 120, a plurality of configuration files 223, 225, . . . , 227, each associated with one of the database tables 222, 224, . . . , 226, are stored. As used herein, configuration files can refer to individual files, each associated with a database table (or other information storage unit), or groupings of data stored within a common file, each grouping of data associated with a database table (or other information storage unit). As illustrated in FIG. 2, the configuration files 223, 225, . . . , 227 are stored in the database 200, but the present invention is not limited thereto, and configuration files can be stored separately from the database 200 according to an alternate embodiment of the present invention. As illustrated in FIG. 2, the configuration files C1 223, C2 225, . . . , CN 227, are associated with the database tables T1 222, T2 224, . . . , TN 226, respectively. Each configuration file 223, 225, . . . , 227 stores update parameters of the associated database table 222, 224, . . . , 226. Update parameters are values associated with a database table that define an automatic update procedure for that database table. The update parameters can include an update period, a source list, and a search term list. The update period specifies a time period for updating the associated database table, the source list specifies one or more security information sources to be used to update the associate database table, and the search terms list specifies one or more terms to be used to search the security information sources for the type of security information stored in the associated database table. The update parameters can be set and a changed by an administrator of the security information repository.

As illustrated in FIG. 3, configuration files 320, 340, 360, and 380 are stored in the database 300 and are associated with the IANA port list table 310, the application list table 330, the Trojan/malware table 350, and the virus/worm table 370, respectively. Each configuration file 320, 340, 360 and 380 includes an update period 325, 345, 365, and 385, which specifies an amount of time between automatic updates of the associated database table 310, 330, 350, and 370 and a source list 324, 344, 364, and 384, which specifies one or more sources for updating the associated database 310, 330, 350, and 370. As illustrated in FIG. 3, the update periods 325, 345, 365, and 385 are given in seconds, and each source list 324, 344, 364, and 384 specifies an exemplary web-based source. In FIG. 3, a search term list 346, which specifies one or more search terms to be used to search the source in the source list 344, is included in the configuration file 340. The present invention is not limited to these update parameters, and these and/or other update parameters can be included in configuration files in any combination.

Figure 4:
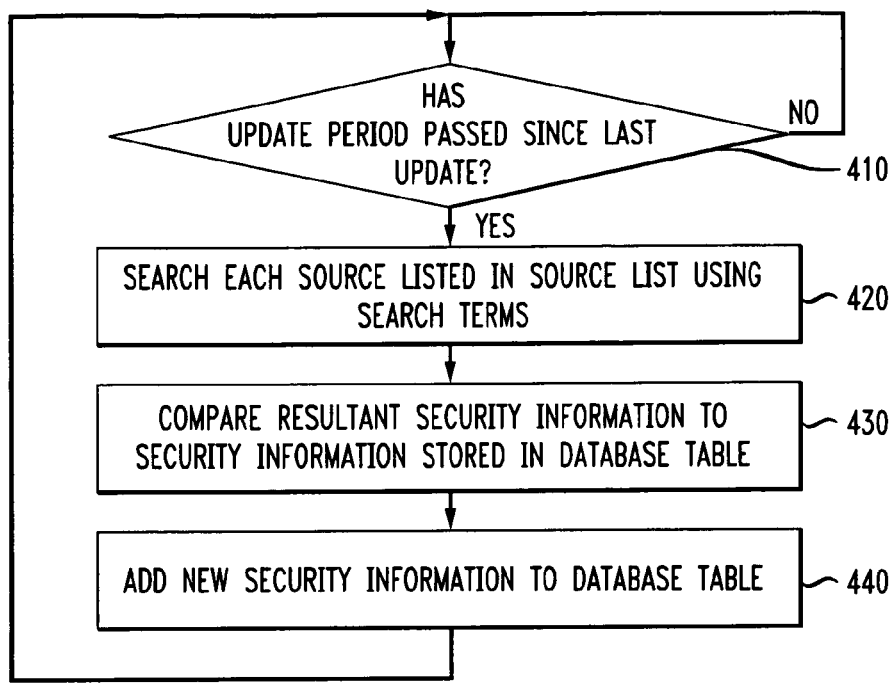
FIG. 4 illustrates a method of periodically automatically updating a database table storing a corresponding type of security information according to an embodiment of the present invention.

Returning to FIGS. 1 and 2, at step 130, each database table 222, 224, ..., 226 is periodically automatically updated based on its update parameters stored in its associated configuration file 223, 225, ..., 227. The DBMS 210 reads the update parameters from each configuration file 223, 225, ..., 227 stored in the database 220, and automatically updates each database table 222, 224, ..., 226 according to its update parameters. The DBMS 210 updates each database table 222, 224, ..., 226 independently from one another. FIG. 4 illustrates a method of automatically updating a database table according to an embodiment of the present invention. Thus, FIG. 4 illustrates step 130 of FIG. 1 in greater detail.

At step 410, for each database table, it is determined whether the update period specified in the configuration file associated with that database table has passed since a previous update. When the update period of a database table has passed since a previous update, the method proceeds to step 420.

At step 420, each source or a subset of the sources specified in the source list of the database table is searched for security information using the search terms specified in the search term list. In a case in which the sources specified in the source list are divided into subsets, each subset can have a corresponding update sub-period which specifies the update periods during which the subset should be searched. For example, an update sub-period of 1 indicates that the subset is searched every update period, and an update sub-period of 2 indicates that the subset is searched every other update period. The DBMS 210 communicates with the sources specified in the source list in order to search each of the sources using the search terms specified in the search term list. As illustrated in FIG. 2, the security information repository system 200 can be connected to a data network 230, and the DBMS can communicate with the specified sources through the data network 230. Security information is returned from each of the sources as a result of the searches performed. This resultant security information can be stored in temporary storage of the security information repository.

At step 430, the resultant security information from each source is compared to the security information already stored in the database table. Because the resultant security information can be returned from various sources, it may be returned in various forms. In order to compare this resultant security information to the security information already stored in the database table, the resultant security information can be standardized to put all of the resultant security information into a common format. The standardized resultant security information is then compared to the records of the database table to determine if the resultant security information is duplicate information to that already stored in the database table or new information. For example, it is possible that security information is considered duplicate information to a record of a database when all of the fields of the record, except a date field and a time field, are the same as in the resultant security information. If there is no record in which every field except the date and time fields match the security information, then the security information is considered new.

At step 440, new security information is added to the database table. In one embodiment of the present invention, if resultant security information is determined to be duplicate information, it is deleted from the temporary memory. Thus, after all of the resultant security information is compared to the security information already stored in the database and the duplicate information is deleted from the temporary storage, only new information remains in the temporary storage. Accordingly, all of the security information remaining in the temporary storage after the duplicate information is deleted is added to the database table. The new security information is added to the database table as new records in the database table.

After step 440, the method returns to step 410. Accordingly, when the update period passes after returning to step 410, the method is automatically repeated.

Figure 5:
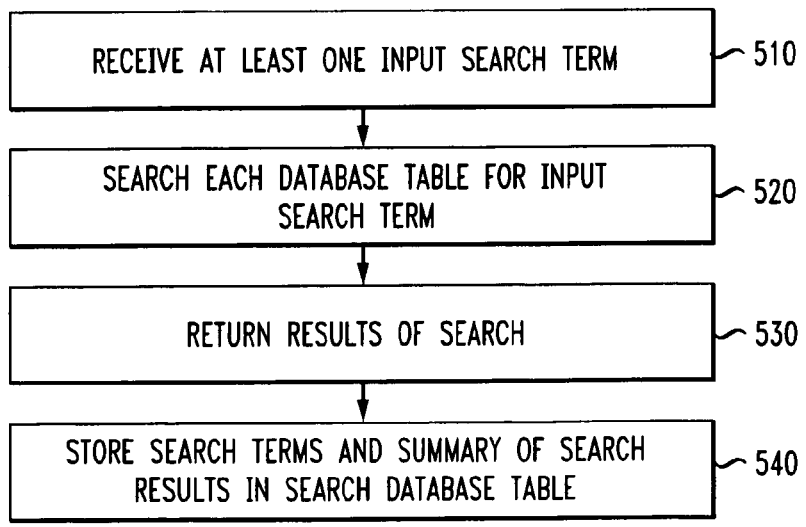
FIG. 5 illustrates a method of searching the security information repository according to an embodiment of the present invention.

As described above, an automated security information repository is maintained and automatically updated. This automated security information repository can be used as a source for a network security analyst (a "user") to search for security information. FIG. 5 illustrates a method of searching the security information repository according to an embodiment of the present invention. The method of FIG. 5 will be described while referring to FIGS. 2 and 5.

At step 510, at least one input search term is received. It is possible that a user can input search terms to the security information repository system 200 through a console or user input device provided at the security information repository system 200. However, it is also possible that a user communicates with the security information repository system 200 remotely. For example, a user may communicate with the security information repository system 200 through the data network 230 by entering search terms through a web interface, an email interface, etc. According to an embodiment of the present invention, in addition to entering search terms, the user can specify a non-specific search to search all fields of each database table 222, 224, ..., 226 or a specific search of one or more specific fields of the database tables 222, 224, ..., 226.

At step 520, each database table 222, 224, ..., 226 is searched for the input search terms. Accordingly, a user can input search terms at one source and search multiple database tables 222, 224, ..., 226 storing various types of security information at once. If the user requests a non-specific search all of the fields of each database table 222, 224, ..., 226 are searched. If the user specifies specific fields to be searched, than only the specified fields of each database table 222, 224, ..., 226 are searched.

At step 530, the results of the search are returned to the user. For example every record in which the specified search terms appear in each of the database tables 222, 224, ..., 226 can be returned to the user. When retuning the search results to the user, the search results can be organized and presented to the user in various formats. For example, the records returned as a result of the search can be organized by type of security information. That is, records from different database tables can be presented separately. However, it is also possible to organize all of the records returned as a result of a search into a table, and generate a field for the type of security information for each record. The search results can be returned to the user in a variety of ways, such as displaying the results on a screen of the user, storing the results at specified location of the user, or transmitting the results to a software application used to analyze the results.

Figure 6:
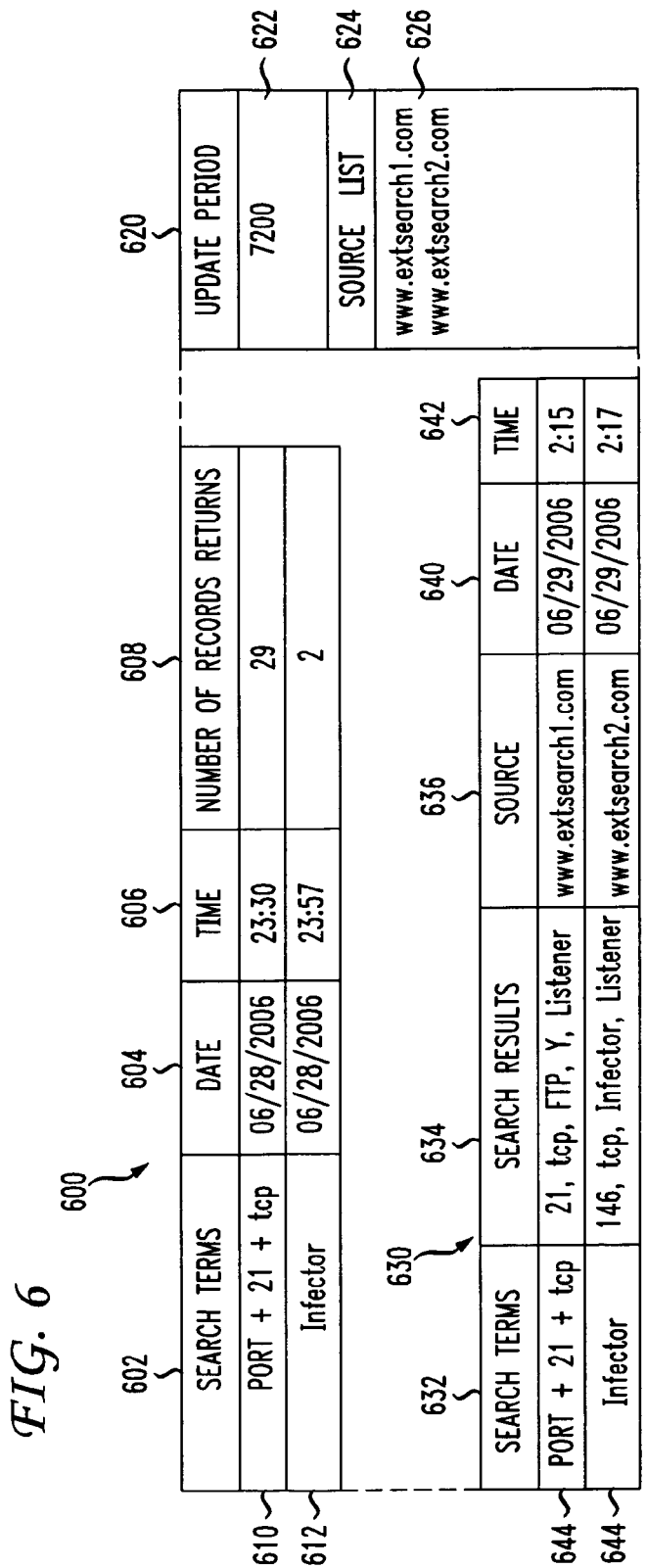
FIG. 6 illustrates exemplary search and search results database tables for automatically updating the security information repository based on performed user searches.

Steps 510-530 of FIG. 5 illustrate a method of performing a search for a user of the security information repository system 200. According to one embodiment of the present invention, searches performed for users of the security information repository system 200 can be automatically used to enhance and update the security information repository system 200. At step 540, the search performed by the security information repository system 200 is stored in a search database table in the database 220. FIG. 6 illustrates an exemplary embodiment of a search database table 600. A search results database table 630 is also stored in the database 220, and the search database table 600 and the search results database table 630 share a common configuration file 620. As illustrated in FIG. 6, the search database table 600 stores records 610 and 612 of searches performed on the security information repository system. Each record 620 and 612 has a search term field 602 to store the search terms of the search, a date field 604 to store date that the search was performed, a time field 606 to store the time that the search was performed, and a number of records field 608 which stores the number of records that were returned from all of the database tables 222, 224, . . . , 226 as a result of the search. The search database 600 can be viewed by an administrator to allow the administrator to analyze whether the security information repository system 200 is meeting users' needs. The configuration file 620 stores update parameters for the search database table 600. The update parameters include an update period 622 and a source list 624.

When the update period 622 passes since a previous update, the sources 626 in the source list 624 are searched using the search terms stored in the search database table 600. Resultant security information from the searches of the sources 626 in the source list 624 is used to update the search result table 630. The resultant security information is compared to the records of each of the database tables 222, 224, . . . , 226 corresponding to the various types of security information, and resultant security information that is not stored in any other database table 222, 224, . . . , 226 is stored in the search results database table 630. As illustrated in FIG. 6, each record 642 and 644 of the search result database table 630 has a search term field 632 corresponding to the search terms used for the search, a search results field 634 to store the resultant security information from the search, a source field 636 corresponding to the source of the resultant security information, a date field 638 corresponding to the date which the resultant security information was added to the search results database table 630, and a time field 640 corresponding to a time at which the resultant security information was added to the search results database table 630. The search results database table 630 can be used by an administrator of the security information repository system 200 to evaluate whether users have searched for a type of security information not previously stored in the security information repository. Accordingly, if a type of security information not previously stored in the security information repository is discovered, an administrator can create a database table corresponding to that type of security information and an associated configuration file, and the newly created database table then automatically self-updates as described above.

In addition to the self-updating database tables 222, 224, . . . , 226 corresponding to various types of security information, the database 220 may also store an analyst information table. The analyst information table allows users of the security information repository system 200 to enter security information manually. The analyst information table is included in searches performed on the security information repository system 200. Accordingly, if a user has information not stored in the security information repository, the user can enter this information manually. This information would then be available for other users searching the security information repository.

Figure 7:
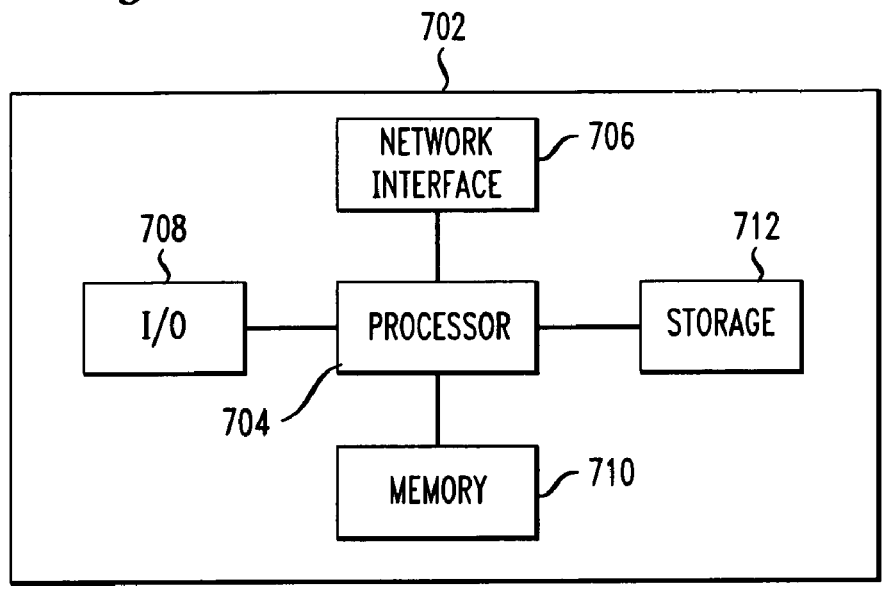
FIG. 7 illustrates a high level block diagram of a computer capable of implementing the present invention.

The security information repository system 200 can be implemented as a computer using well known computer processors, memory units, storage devices, computer software, and other components. A high level block diagram of such a computer is illustrated in FIG. 7. Computer 702 contains a processor 704 which controls the overall operation of the computer 702 by executing computer program instructions which define such operation. The computer program instructions may be stored in a storage device 712 (e.g., magnetic disk) and loaded into memory 710 when execution of the computer program instructions is desired. Thus, the DBMS 210 can be implemented as applications defined by the computer program instructions stored in the memory 710 and/or storage 712 and controlled by the processor 704 executing the computer program instructions. The database 220 can be stored in the storage 712. The computer 702 also includes one or more network interfaces 706 for communicating with other devices via a network. Thus, the DBMS 210 can communicate with security information sources via a network using the network interfaces 706. The computer 702 also includes input/output 708 which represents devices which allow for user interaction with the computer 702 (e.g., display, keyboard, mouse, speakers, buttons, etc.) It is possible that a user can request searches and receive search results via the input/output 708. One skilled in the art will recognize that an implementation of an actual computer will contain other components as well, and that FIG. 7 is a high level representation of some of the components of such a computer for illustrative purposes The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
   storing a plurality of types of security information in a corresponding plurality of information storage units, wherein the plurality of types of security information comprises port information, application information, Trojan/malware information, and virus/worm information, each one of the plurality of information storage units is designated for a different one of the plurality of types of security information and each one of the plurality of types of security information is stored separately in one of the plurality of information storage units designated for that type of security information;
   storing a plurality of configuration files respectively associated with the plurality of information storage units, each configuration file including update parameters of the associated information storage unit;
   periodically automatically updating each of the information storage units based on the update parameters of the configuration file associated with each information storage unit;
   receiving at least one input search term from a user;
   searching each of the information storage units based on the at least one input search term;
   returning search results of each of the information storage units;
   in response to searching each of the information storage units based on the at least one input search term, storing the at least one input search term in a portion of a search

9 information storage unit that is designated for storing search terms of searches previously performed on the information storage units;

periodically automatically performing external searches based on update parameters stored in a configuration file associated with the search information storage unit using the stored at least one input search term; and storing resultant security information from the external searches in a search results information storage unit.

2. The method of claim 1, wherein the information storage units comprise one of database tables, databases, database records, and computer files.

3. The method of claim 1, wherein the step of periodically automatically updating each of the information storage units comprises:

periodically automatically updating each of the information storage units independently of the other information storage units.

4. The method of claim 1, wherein the update parameters comprise at least one of an update period which specifies an amount of time between automatic updates, a source list which specifies at least one security information source, and a search term list which specifies at least one search term.

5. The method of claim 4, wherein, for each of the information storage units, the step of periodically automatically updating comprises:

determining whether the update period for the information storage unit has passed since a previous update;

when the update period for the information storage unit has passed since a previous update, automatically searching the at least one security information source specified in the source list for security information using the at least one search term specified in the search term list;

comparing security information resulting from the searching step with the security information stored in the information storage unit; and storing security information not already stored in the information storage unit in the information storage unit.

6. The method of claim 5, wherein the step of comparing security information comprises:

storing the security information resulting from the searching step in a temporary storage;

standardizing the security information stored in the temporary storage to a predetermined format; and determining whether the standardized security information is already stored in the information storage unit.

7. The method of claim 6, wherein the step of storing security information not already in the information storage unit in the information storage unit comprises:

deleting security information resulting from the searching step that is already stored in the information storage unit from the temporary storage; and transferring security information resulting from the searching step remaining in the temporary storage after the deleting step to the information storage unit.

8. The method of claim 1, wherein the update parameters stored in the configuration file associated with the search information storage unit comprise at least one of an update period which specifies an amount of time between external searches and a source list which specifies security information sources to be searched in the external sources.

9. The method of claim 1, wherein the step of storing resultant security information comprises:

determining whether the resultant security information is already stored in any of the information storage units; and

10 storing resultant security information that is not already stored in any of the information storage units in the search results information storage unit.

10. A storage computer readable medium having a database stored thereon, the database comprising:

a plurality of information storage units for storing, separately, in different information units different types of security information, wherein the plurality of types of security information comprises port information, application information, Trojan/malware information, and virus/worm information and each information storage unit is designated for a different type of security information;

a plurality of configuration files each associated with one of the plurality of information storage units, each configuration file including update parameters relating to an automatic update procedure of the associated information storage unit a search information storage unit for storing input search terms of searches performed on the plurality of information storage units in a portion of the search information storage unit that is designated for storing search terms of previously performed searches, in response to searches being performed on the plurality of information storage units;

a search configuration file associated with the search information storage unit and including update parameters defining an automatic update procedure of the search information storage unit; and a search results information storage unit for storing results of external searches performed during the automatic update procedure of the search information storage unit using the input search terms stored in the search information storage unit.

11. The storage computer readable medium of claim 10 wherein the information storage units comprise one of database tables and database records.

12. The storage computer readable medium of claim 10, wherein the update parameters comprise at least one of:

an update period which specifies an amount of time between automatic updates of the associated information storage unit;

a source list which specifies at least one source to be searched during an automatic update of the associated information storage unit; and a search term list which specifies at least one search term to be used to search the at least one source during an automatic update.

13. The storage computer readable medium of claim 10, wherein the database further comprises:

an analyst information storage unit for storing security information manually input by users.

14. A system comprising:

means for storing a database comprising a plurality of information storage units for storing separately, in different ones of the information storage units different types of security information, wherein the different types of security information comprises port information, application information, Trojan/malware information, and virus/worm information and each information storage unit is designated for a different type of security information, and a plurality of configuration files each associated with one of the plurality of information storage units, each configuration file including update parameters of the associated information storage unit;

means for periodically automatically updating each of the information storage units based on the update parameters of the configuration file associated with each information storage unit;

means for receiving at least one input search term from a user, wherein the database further comprises a search information storage unit for storing the at least one input search term in a portion of the search information storage unit that is designated for storing search terms of searches previously performed on the information storage units, in response to a search of the information storage units based on the at least one input search term, and a search configuration file associated with the search information storage unit and including update parameters of the search information storage unit;

means for searching each of the information storage units based on the at least one input search term;

means for returning search results of each of the information storage units; and means for periodically automatically performing external searches based on the update parameters of the search information storage unit using the at least one input search term stored in the search information storage unit.

15. The system of claim 14, wherein the information storage units comprise one of database tables and database records.

16. The system of claim 14, wherein the update parameters comprise at least one of an update period which specifies between automatic updates, a source list which specifies at least one security information source, and a search term list which specifies at least one search term.

17. The system of claim 16, wherein the means for periodically automatically updating comprises:

means for determining whether the update period of an information storage unit has passed since a previous update;

means for automatically searching each security information source specified in the source list for security information using the search terms specified in the search term list;

means for comparing resultant security information from each security information source with the security information stored in the information storage unit; and means for adding security information not already stored in the information storage unit to the information storage unit.

18. The system of claim 14, wherein the database further comprises:

a search result information storage unit for storing resultant security information from the external searches.

* * * * *